United States Patent [19]

Kasai et al.

[11] Patent Number: 4,965,598

[45] Date of Patent: Oct. 23, 1990

[54] PRINTING APPARATUS

[75] Inventors: Toshihiro Kasai, Kanagawa; Mitsuaki Kouyama, Tokyo, both of Japan

[73] Assignee: Kabushiki Kaisha Toshiba, Kawasaki, Japan

[21] Appl. No.: 320,443

[22] Filed: Mar. 8, 1989

[30] Foreign Application Priority Data

Mar. 17, 1988 [JP] Japan .................................. 63-64066

[51] Int. Cl.[5] .............................................. G01D 15/00

[52] U.S. Cl. .................................. 346/160.1; 346/74.4

[58] Field of Search ..................... 346/151, 160.1, 74.4, 346/74.5

[56] References Cited

U.S. PATENT DOCUMENTS 4,072,957 2/1978 Kokaji et al. ....................... 346/74.1

4,416,968 11/1983 Held .................................. 346/74.4

*Primary Examiner*—Arthur G. Evans

*Attorney, Agent, or Firm*—Foley & Lardner, Schwartz, Jeffery, Schwaab, Mack, Blumenthal & Evans

[57] ABSTRACT

The invention provides a printing apparatus. The said printing apparatus comprises thermosensitive adhesive paper and a thermal recording head. The printing apparatus heats the thermal recording head to form a thermal pattern image on the thermosensitive adhesive paper. The imaging part on the thermosensitive adhesive paper then becomes adhesive, causing the first developer adhere to the adhesive imaging part on the thermosensitive adhesive paper. Then the first developer is magnetized. After being adhered to the first developer, the second developer is transferred to the paper. The printing apparatus prints manuscripts rapidly using the master image formed by the first developer.

6 Claims, 3 Drawing Sheets

PRINTING APPARATUS

BACKGROUND OF THE INVENTION

This invention relates to a printing apparatus using a magnetic image recording process. More specifically, the present invention relates to a printing apparatus which has a recording master formed of magnetic material.

It is known to use a copying machine and an engraving printing apparatus for printing images. Preparations for copying with an electronic copying machine are easy to make, and the copying machine is easy to use. In the engraving printing apparatus, a form is made from a manuscript page and the manuscript can be repeatedly copied on recording paper using the form. The engraving printing apparatus makes high-speed printing possible after the form has been made. Use of engraving printing apparatus has an advantage in that copying costs less with increasing numbers of copies. The apparatus, however, requires a lot of time and labor to prepare for printing work, because of the process of making the form. The electronic copying machine prints at a much lower speed than conventional gravity printing machines. The electronic copying machine must go through numerous processes, such as electrostatic charging, exposure, developing, and electro-removal for each individual copy of a manuscript. When the copying machine copies at a higher speed, over-speed developing may deteriorate the printed image.

Therefore, an apparatus has been practically used which can copy at the same speed as an engraving printing machine, yet does not require the same operations or preparations as a printing machine. An example of this apparatus is the printing apparatus disclosed in the U.S. Pat. No. 4,072,957. The printing apparatus comprises a print drum with a magnetic thin film and a magnetic head to record magnetic latent images on the print drum. The printing apparatus makes magnetic toner adhere to the magnetic latent images to develop the images. Then the apparatus transfers and prints the images developed with magnetic toner onto a paper. After the apparatus forms magnetic latent images on the print drum, it prints by repeated developing with magnetic toner. The printing apparatus scans the print drum from one end to the other by the recipiocating movement of a magnetic head, to form magnetic latent images. Therefore, the printing apparatus takes time to form magnetic latent images.

SUMMARY OF THE INVENTION

It is an object of the present invention to provide a solution to the above stated problem. In particular, the invention is intended to provide a printing apparatus which is easy to operate and can print rapidly.

In accordance with the present invention, the foregoing objects, among others, are achieved by providing a printing apparatus for producing multiple copies of an original image on a recording medium from a master, comprising, means for forming a latent image on the master corresponding to the original image, means for developing the latent image formed on the master, means for applying a second developer image corresponding to the original image to the developed latent image, and means for transferring substantially only the second developer image to the recording medium.

Other objects, features, and advantgages of the present invention will become apparent from the following detailed description. It should be understood, however, that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of present invention and many of its attendant advantages will be readily obtained by reference to the following detailed description considered in connection with the accompanying drawings in which.

DETAILED DESCRIPTION OF THE PREFERRED EMBODIMENT

Figure 1:
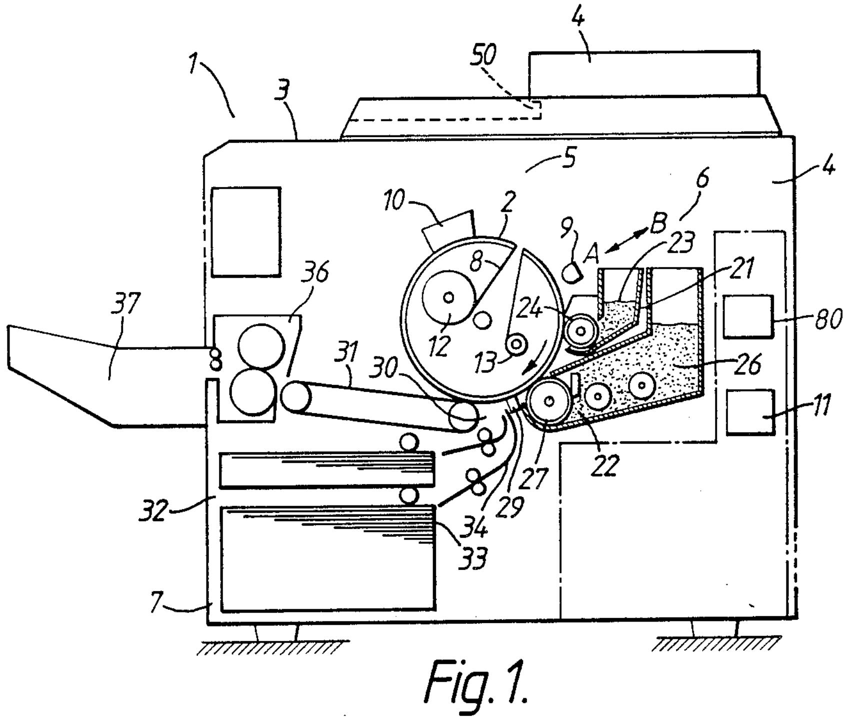
FIG. 1 is a side view of the printing apparatus according to the present invention.

FIG. 1 shows a side view of a printing aparatus according to the present invention. Printing apparatus 1 comprises a housing 3 including a drum 2 therein, and a manuscript-reading device 4 located on housing 3 for reading manuscripts. Housing 3 includes an image forming section 5, which forms images on drum 2, a developing section 6, which develops images on drum, and a conveying section 7, which conveys paper. Image forming section 5 comprises drum 2 and a thermal recording head 9, which procides heat to thermosensitive adhesive paper 8 on drum 2. Drum 2 is rotatably mounted within housing 3. Drum 2 may be rotated in the direction shown by the arrow at least at two different velocities, $V_1$ and $V_2$, $V_1$ $V_2$ by a drive not shown. The first velocity $V_1$ is selected within the range of 10–50 m/sec according to control signals to drive drum 2 from a print control 11.

Thermosensitive adhesive paper 8 acting as an image-carrier is applied on the outer surface of drum 2. Thermosensitive adhesive paper 8 is supplied from a feeding roll 12. Thermosensible adhesive paper 8 is then rolled up by a take-up roll 13 after use. The length of thermosensitive paper 8 necessary for one image is supplied over drum 2 from feeding roll 12 at one time. The same length is rolled up by take-up roll 13 after use. Every time a different manuscript is to be printed, another predetermined length of thermosensitive adhesive paper 8 is fed to drum 2.

A 5–30 micrometer thickness of hot-melt resin is applied to one side of thermosensitive adhesive paper 8. Alternatively, a coating material maybe made from an adhesive substance covered with a non-adhesive substance and made into micro capsules. This coating may be applied to thermosensitive adhesive paper 8.

Thermal recording head 9 is located outside of drum 2, so that the thermosensitive adhesive paper 8 can be exposed to the heat from the head 9, and the head 9 can move toward and away from thermosensitive adhesive paper 8. Thus, thermal recording head 9 can move in the directions shown by arrows A and B. When forming a master image described hereinafter, recording head 9 moves in the direction shown by arrow A in response to control signals from print control unit 11 until it comes into contact with thermosensitive adhesive paper 8. When a master image is not being formed and during printing, recording head 9 moves in the direction shown by arrow B, separating from thermosensitive adhesive paper 8 to a stand by position. Thermal recording head 9 is driven according to the image signal which has been read by manuscript reading device 4 when a master image is being formed. The thermal recording head 9 has a plurality of heat elements which generates heat selectively according to the image signal. Then, a thermal pattern image is formed on the thermosensitive adhesive paper 8 on drum 2 according to the image signal. The thermal recording head 9 may be of a type used in some machines, such as a commonly used heat transfer printer. The length of thermal recording head 9 is sufficient to cover the whole range of the available widths of thermosensitive adhesive paper 8. The imaging part of thermosensitive adhesive paper 8 becomes adhesive due to the action of the heat from the thermal head 9 on the resin or adhesive coating.

Along the rotating direction of rotating drum 2 are located a first developing device 21 serving as a first means of magnetic particle figure formation, and a second developing device 22 serving as the second means of magnetic particle figure formation.

First developing device 21 utilizes a magnetic one component developing method and includes a first magnetic developer 23, which is a carrierless toner, therein. Magnetic developer 23 must be a magnetic material having higher residual magnetizing force and higher coercive force than the magnetic materials conventionally used. Particulate magnetic materials, such as barium ferrite, γ-$Fe_2O_3$, $Fe_3O_4$, Co-γ-$Fe_2O_3$, $CrO_2$, or Fe (metal particles), which have excellent magnetizing properties, are suitable for the magnetic material. The magnetic material may be a magnetic material which is easily magnetized permanently in a magnetic field such as that made by a magnetizer 10, which will be described hereinafter. Other magnetic particles with higher magnetizing properties than those stated above may also be used as the magnetic material. These particles are used as the first magnetic developer 23 after 20–80% by weight of the particles and the binding resin are mixed together. The particles of first magnetic developer 23 normally have an average diameter of 1–30 micrometers. Particles of magnetic material with an average diameter of 1–30 micrometers may be used as the developer without being dispersed in the resin.

First developer device 21 has a magnet sleeve 24 facing drum 2. Magnet sleeve 24 is made to rotate by a drive (not shown). Magnet sleeve 24 rotates to feed first magnetic developer 23 onto thermosensitive adhesive paper 8. Second developing device 22 contains the second magnetic developer 26 therein. A magnetic one component toner composed of magnetic particles which have high electric resistance and low residual magnetizing force, such as $Fe_2O_4$, is suitable for the second magnetic developer 26.

Second developing device 22 has magnet sleeve 27 facing drum 2. Magnetic sleeve 27 is made to rotate by a drive (not shown). Magnetic sleeve 27 rotates to feed second magnetic developer 26 onto thermosensitive adhesive paper 8.

Along the outer surface of rotating drum 2 are located a before-transfer corona electro-static charger 29, a paper feeder 30, and a transfer means such as an endless transfer belt 31.

Charger 29 uniformly charges second magnetic developer 26, which is absorbed on first magnetic developer 23. Then, paper feeder 30 syncronizingly sends forth recording paper 33, an image forming medium, which is piled in a paper container 32, between transfer belt 31 and thermosensitive adhesive paper 8 through guide 34. Transfer belt 31 which is made of conductive material has a dielectric film, such as polyester, with a thickness of about 20–40 micrometers coated on the surface thereof. A bias voltage of about 1000 volts with a reversed polarity compared with that of the before-transfer corona charged elecro-static charger 29 is applied to transfer belt 31. A fixing device 36 of the well-known heat roller type and a discharged paper tray 37 are located at the forward end of transfer belt 31. Charging of the recording paper 33 by corona discharge may be substituted for applying the bias voltage to transfer belt 31, as a described above.

Further, along the outer surface of drum 2 is located a magnetizer 10. Magnetizer 10 has a magnet head 46 of a size sufficient to cover the whole range of the available width of thermosensitive adhesive paper 8.

Figure 2:
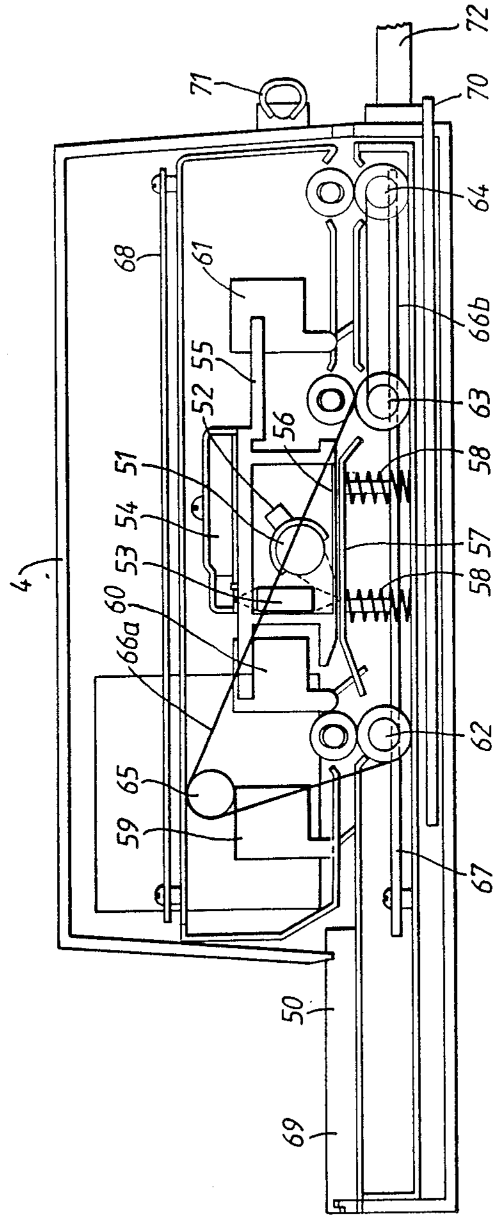
FIG. 2 is a side view of the manuscript-reading device of the printing apparatus shown in FIG. 1.
Figure 3A:
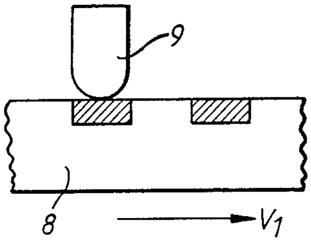
FIG. 3 is a schematic view showing the image forming process used by the printing apparatus according to the present invention.
Figure 3B:
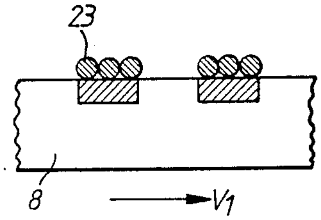
Figure 3C:
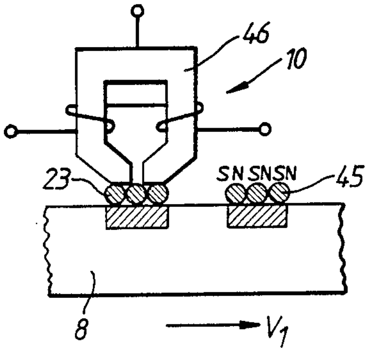
Figure 3D:
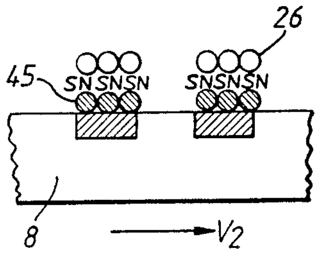
Figure 3E:
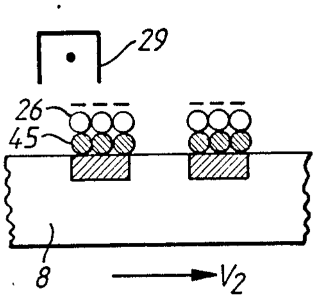
Figure 3F:
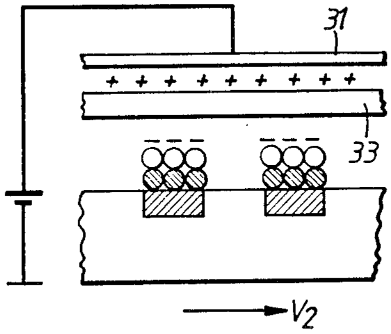

Manuscript-reading device 4 has a structure as shown in FIG. 2. FIG. 2 is a side view of manuscript-reading device 4 located on housing 3 of printing apparatus 1. A xenon discharge tube, which emits yellowish green light, for example, is used as a light source 51 for illuminating the manuscript. A xenon discharge tube cover 52 protects the auxiliary electrode (not shown) attached on the rear surface of xenon discharge tube 51, and also isolates the back of xenon discharge tube 51 from emission of light. The reflected light from the manuscript illuminated with light from the xenon discharge tube 51 is converged by a cylindrical lens array 53 to form an image on a photoelectric transfer element 54. Photoelectric transfer element 54 transfers changes in brightness of the reflected light which forms an image, as described above, into electric signals.

Photoelectric transfer element 54 comprises an amorphous silicon sensor arranged in a length of 1728 bits, so as to suit an A4 manuscript with 8 pizels/mm. The photoelectric system comprises xenon discharge tube 51, discharge tube cover 52, cylindrical lens array 53 and photoelectric transfer element 54, all of which are brought together into one unit by optical system base 55. Optical system base 55 is alumite-treated for insulation from static electricity.

Plate glass 56 with high penetrability is used to guide the manuscript in the forwarding course. Under plate glass 56 is located a reference color correcting plate 57. When no manuscript is on plate glass 56, photoelectric transfer element 54 receives the reflected light from reference color correcting plate 57. Reference color correcting plate 57 is used to read the data for reference white correction, which corrects shading distortion noise of the photoelectric transfer element 54 or image signals including dispersed pixels of the photoelectric transfer element 54.

Reference color correcting plate 57 is specially coated so as to be soil resistant. Reference color correcting plate 57 is always pressed toward plate glass 56 by a spring 58, which has low elasticity and slightly contacts with plate glass 56.

First manuscript detector 59 is located at manuscript inlet 50 to detect an inserted manuscript. First manuscript detector 59 detects the manuscript inserted into the apparatus, and specifies the timing to start reading the data for reference white correction by reference color correcting plate 57.

Second manuscript detector 60 is located beside cylindrical lens array 53, between the lens array and inlet 50. Second manuscript detector 60 specifies the timing to start reading the image information on the manuscript. Third manuscript detector 61 located to the rear of cylindrical lens array 53. Third manuscript detector 61 specifies the timing to discharge the manuscript.

Along the conveying path, which guides inserted manuscripts from inlet 50 to cylindrical lens array 53, are located manuscript feeding rollers 62, manuscript conveying rollers 63, and manuscript discharging rollers 64. Manuscript feeding rollers 62 send a manuscript inside the apparatus. Manuscript conveying rollers 63 convey the manuscript. The manuscript discharging rollers 64 convey the manuscript for discharge. The upper rollers of rollers 62, 63 and 64 are made of plastic, and the lower rollers are made of rubber. There is some play at the bearing of each upper roller, so that the upper roller can move vertically to adjust itself to the thickness of the manuscript. Rollers 62, 63 and 64 are driven by a stepping motor 65. The power of stepping motor 65 is transmitted to rollers 62, 63 and 64 through belts **66*a* and 66*b*. Power device 67 is located at the bottom of manuscript-reading device 4. Power device 67 supplies a DC voltage to control base 68 and stepping motor 65**.

A manual feed guide 69 is located outside of inlet 50. Manual feed guide 69 guides manuscript to inlet 50.

A discharged paper tray 70 is removably located outside of manuscript-reading device 4. Discharged paper tray 70 receives discharged manuscripts. An interface connector 71 is located above discharged paper tray 70 outside of manuscript-reading device 4. Interface connector 71 transmits signals between the reading device and the printing apparatus. Manuscript-reading device 4 is supplied with power through power cable 72.

The manuscript-reading process by manuscript reading device 4 is as follows:

Manual feed guide 69 inserts the manuscript properly to inlet 50. First manuscript detector 59 then detects the inserted manuscript, causing the stepping motor to start. The rotation of stepping motor 65 is transmitted to manuscript feeding rollers 62 and manuscript conveying rollers 63 through belt **66*a*, causing the rollers to rotate. The manuscript is conveyed by manuscript feeding rollers 62 and the manuscript conveying rollers a they rotate. When second manuscript detector 60 detects the manuscript, photoelectric transfer element 54 reads reference color collecting plate 57. The reading signals of reference color collecting plate 57** are used as data for collecting when the manuscript is read.

The manuscript is led between plate glass 56 and reference color collecting plate 57. When the manuscript reaches under cylindrical lens array 53, the xenon discharge tube emits light. The reflecting light from the manuscript is converged through a cylindrical lens array 53 to form an image on a photoelectric transfer element 54. Photoelectric transfer element 54 transfers the reflected light which forms an image into electric signals depending of the quantity of light. The image, or transferred signal is transmitted to a memory 80, which is located within the printing apparatus 1 through an interface connector 71. After all the image information of the manuscript to be conveyed is read, the manuscript is discharged out of the apparatus by the manuscript discharging rollers 64. The manuscripts discharged from the apparatus are piled up on discharged paper tray 70, which projects from the apparatus.

The image information of a sheet of manuscript which is stored in memory 80 within printing apparatus 1 is used for image forming, which will be described hereunder.

Next the operation of image forming device 1 with the structure as described hereinabove will be described using the schematic view showing processes in FIG. 3.

When manuscript reading device 1 starts to read the manuscript, the control signals from the printing control 6 make drum 2 together with the thermosensitive adhesive paper 8 rotate in the direction of the arrow at the first velocity $v_1$. These move in the direction of arrow A until thermal recording head 9 touches thermosensitive adhesive paper 8. Then the image information which is read by manuscript reading device 4 and stored in memory 80 is made into signals by a known means, and the signals are fed to thermal recording head 9. Thus thermal recording head 9 selectively generates heat depending on the image information, as shown FIG. 3 (*a*) to heat thermosensitive adhesive paper 8 at the contact points with thermal recording head 9. This causes the heated part of thermosensitive adhesive paper 8 to become adhesive.

These operations are repeated for one entire image to form an adhesive pattern image.

The thus obtained adhesive pattern image passes first developing device 21 and first magnetic developer 23 adheres to the adhesive part and is developed, as shown in FIG. 3 (*b*). Then the first magnetic particle image conforming to the image signal is formed on thermosensitive adhesive paper 8 on drum 2. During the forming process of the first magnetic particle image, the only thing required is physical adhesive strength. Electric power, as is required in the case of electrostatic images, is not needed. Drum 2 with thermosensitive adhesive paper 8 rotatingly moves at the first velocity $v_1$ until it reaches magnetizer 10, as shown in FIG. 3 (*c*).

Then first magnetic particles 23 on thermosensitive adhesive paper 8 are permanently magnetized by magnetic head 46. Thus first magnetic developer 23 is formed on thermosensitive adhesive paper 8 using master image 45. Now the master image forming process has finished. The voltage applied to magnetizer 10 forms an AC magnetic field to periodically change the magnetizing direction so as to make developing by second magnetic developer 26 easy. During the permanent magnetization described above, the thermosensitive adhesive paper 8 is not magnetized because it is non-magnetic. Only master image 45 is magnetized. Magnetic head 46 gives a magnetic field of the same magnetic polarity in the transverse direction of thermosensitive adhesive paper 8. Thus, a head of simple structure whose length is the same as the width of thermosensitive adhesive paper 8 can be used as magnetic head 46.

As described above, during the first spin of drum 2 (the master image forming process), a magnetized master image, that is, a magnetized pattern as a magnetic latent image, is formed.

In this way, the master image conforming to the image which has been read by manuscript reading device 4 is formed on drum 2. Drum 2 keeps rotating, and the control signal from print control 11 gives drum 2 a second spin and onward at the second velocity $v_2$.

The master image on drum 2, which rotates rapidly at the second velocity $v_2$, is developed by second developing device 22. The image developed by second developing device 22 with the second magnetic developer is transferred to recording paper 33. When master image 45 magnetized through the master image forming process reaches second developing device 22, second magnetic developer 26 is attracted by the magnetic force of master image 45 to adhere on the surface of the image, as shown in FIG. 3(*d*). A second magnetic particle figure conforming to master image 45 is formed on drum 2.

Second magnetic developer 26 need not be charged because it is absorbed by the magnetic force of master image 45. The magnetic force of magnet sleeve 27 located in the second developing device 22 is adjusted to keep a predetermined balance with the magnetic force of the magnetized master image 45. The developing efficiency decreases if the magnetic force of magnet sleeve 27 for conveying second magnetic developer 26 to master image 45 is too powerful. Therefore, a clear image cannot be obtained. Moreover, if magnet sleeve 27 forms a bigger external magnetic field than the retaining force of first magnet sleeve 24, the master image will disappear. If the magnetic force of magnet sleeve 27 is too low, second magnetic developer 26 cannot be smoothly conveyed causing a poor image. Therefore, the magnetic force of magnet sleeve 27 is adjusted to maintain a balance with the magnetic force of magnetized master image 45.

As shown in FIG. 3(*e*), the second magnetic particle figure which is formed as described above receives a before-transfer corona discharge by electostatic charger 29 to become negatively charged. Recording paper 33, sent out from paper feeder 30, is syncronizingly transferred in the same direction as the rotating direction of drum 2. Transferred recording paper 33 is then inserted between thermosensitive adhesive paper 8 and transfer belt 31.

As shown in FIG. 3(*f*), a bias voltage with reversed polarity to the before-transfer corona changer is applied to transfer belt 31. Thus second magnetic developer 26 is electrostatically transferred to recording paper 33 in succession. After transfer, recording paper 33 is sent to heat roller type fixing device 36 as transfer belt 31 moves. Recording paper 33 is heated and, at the same time, pressurized by fixing device 36 so as to fix the image. After the image is fixed, the recording paper 33 is discharged to discharge paper tray 37. When electrostatic charger 29 is sufficiently charged during image development by using frictionally electrified toner as the second magnetic developer 26, it is possible to omit the discharging before-transfer corona by electro-static charger 29. In order to electrostatically transfer in a short time without fail, such as the case of rapid transfer, it is preferable to sufficiently charge second magnetic developer 26 by before-transfer corona discharge.

In order to make another copy of the same manuscript right after the first copy, the second magnetic particle figure forming process (FIG.3 (*d*)), before-transfer corona discharge (FIG. 3(*e*)) and the transfer process (FIG. (*f*)), must be repeated at the second velocity $v_2$. Printing apparatus 1 can print any number of copies of the same image by using the master image which has been formed. After master image 45 is formed and magnetized, the adhesive pattern image forming process (FIG. 3 (*a*)), the first magnetic particle figure forming process (FIG. 3(*b*)), and the magnetizing process (FIG. 3(*c*)) can be omitted. Electric power for formation of an adhesive pattern image can be appropriated for the driving power of fixing device 36. After making a plurality of copies of one manuscript, only the part of thermosensitive adhesive paper 8 on which master image 45 is fixed is taken up by take-up roll 13. Then another length of unused thermosensitive adhesive paper 8 is sent out on drum 2 from feeding roll 12.

As described hereinabove, according to the present invention, when another copy is to be made after the first copy, the master image forming process can be omitted, which results in reduction of electric power as well as rapid printing at the high rotating velocity $v_2$ after forming of the master image. This can increase printing speed including the master image forming process.

Furthermore, the printing cost per copy decreases with an increasing number of copies of the same manuscript.

After the first copy is made, another copy of the same manuscript requires only a short image forming process. Therefore, there is no need to increase the developing speed with the increased copying speed, and the developing speed which is not too high can prevent the image from deteriorating. First magnetic developer 23 is used to obtain the master image, and has nothing to do with the actual color of the copy. Therefore, the developer can be of any color. This is another advantage, where a material which is easy to be magnetized can be selected easily.

Another embodiment where an adhesive pattern image is formed will be described hereunder. Besides the above technique, a thermosensitive recording technique also may used as a means for adhesive pattern image formation.

Figure 4:
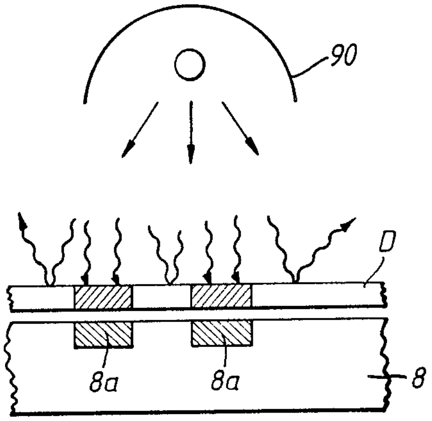
FIG. 4 is a schematic view showing a part of the image forming process used in another embodiment of the present invention.

FIG. 4 shows another embodiment of the present invention. As shown in FIG. 4, the manuscript laid on the thermosensitive adhesive paper 8 is supplied with light radiation from a flash lamp 90 behind the adhesive paper. The part of the manuscript which has more light absorption (black part) is heated. The heated part transmits heat to a corresponding part 8*a* of the contacting thermosensitive adhesive paper 8 to make it adhesive. Thus an adhesive pattern image can be formed on thermosensitive adhesive paper 8. The adhesive pattern image made as above may apply to image formation by the same processes as those in FIG. 3 (*b*)–(*f*), which are described in relation to the previous embodiment.

What is claimed is:

1. A printing apparatus for producing multiple copies of an original image on a recording medium comprising:
   - a drum;
   - a master provided on the drum, the master formed of a thermosensitive adhesive material;
   - means for rotating the drum;
   - means for selectively heating on the master, while being rotated by the rotating means, an image corresponding to the original image so as to form an adhesive pattern of the image on the master;
   - means for developing the adhesive pattern image on the master the developing means having means for supplying a first magnetic developer to the adhesive pattern image on the master and means for permanently magnetizing the first magnetic developer on the master so as to form the master image;
   - means for applying a second developer image, corresponding to the original image, to the developed master image rotated by the rotating means, the applying means having means for adding a second magnetic developer to the master image; and means for transferring substantially only the second developer image to the recording medium.

2. A printing apparatus according to claim 1, wherein the applying means includes means for adding a second developer to the master, and the transferring means comprises:

means for charging the second developer on the master, and means for removing the second developer from the master to the recording medium.

3. A printer apparatus according to claim 1, wherein the first developer contains a magnetic material having high residual magnetizing force and high magneto-retaining force.

4. A printing apparatus according to claim 1, wherein the second developer contains a magnetic material having high electric resistance and low residual magnetizing force.

5. A printing apparatus according to claim 1, wherein the rotating means rotates the drum at one velocity during the forming of the master and at a higher velocity during the transfer of the developed image to the recording medium.

6. A printing method comprising the steps of:

rotating a master having a thermosensitve adhesive material;

selectively heating on the master an image corresponding to the original image, so as to form an adhesive pattern image on the master;

supplying a first magnetic developer to the adhesive pattern image of the master, so as to develop the adhesive pattern image on the master;

permanently magnetizing the first magnetic developer on the master so as to form the master image;

adding a second magnetic developer to the master image so as to apply a second developer image corresponding to the original image to the developed master image; and transferring substantially only the second developer image to a recording medium.

* * * * *